US012305779B2

(12) United States Patent
Altenrath

(10) Patent No.: US 12,305,779 B2
(45) Date of Patent: May 20, 2025

(54) TUBE CONNECTOR SYSTEMS

(71) Applicant: Danfoss A/S, Nordborg (DK)

(72) Inventor: Hans Jörg Altenrath, Lohmar (DE)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 18/262,393

(22) PCT Filed: Jan. 22, 2021

(86) PCT No.: PCT/IB2021/000025
§ 371 (c)(1),
(2) Date: Jul. 21, 2023

(87) PCT Pub. No.: WO2022/157528
PCT Pub. Date: Jul. 28, 2022

(65) Prior Publication Data
US 2024/0077155 A1    Mar. 7, 2024

(51) Int. Cl.
*F16L 19/10* (2006.01)
*F16L 19/08* (2006.01)
*F16L 19/12* (2006.01)

(52) U.S. Cl.
CPC .............. *F16L 19/10* (2013.01); *F16L 19/08* (2013.01); *F16L 19/086* (2013.01); *F16L 19/12* (2013.01)

(58) Field of Classification Search
CPC ......... F16L 19/08; F16L 19/086; F16L 19/10; F16L 19/12
See application file for complete search history.

(56) References Cited

U.S. PATENT DOCUMENTS 6,073,976 A * 6/2000 Schmidt .................. F16L 19/12
285/341

FOREIGN PATENT DOCUMENTS

| DE | 29604873 U1 | * | 5/1996 | .............. F16L 19/12 |
| DE | 4229502 C2 | * | 1/1998 | .............. B23P 11/00 |
| DE | 202015004352 U1 | * | 11/2015 | ............ F16L 19/065 |
| EP | 1484543 A1 | * | 12/2004 | ............ F16L 19/103 |

(Continued)

OTHER PUBLICATIONS

International Search Report and Written Opinion of the International Searching Authority for International Patent Application No. PCT/IB2021/000025 mailed Sep. 22, 2021, 11 pages.

*Primary Examiner* — Zachary T Dragicevich
*Assistant Examiner* — Alexander T Rufrano
(74) *Attorney, Agent, or Firm* — Merchant & Gould P.C.

(57) ABSTRACT

A connector system includes a fitting body (104) and a union nut (106). A cutting ring (102) is disposed proximate within the fitting body and union nut. The cutting ring includes a first end (136) engaging with the fitting body and having at least one cutting edge, a second end engaging with the union nut, and a radially extending collar (140) disposed between the first end and the second end. The collar having an annular radial surface facing the first end and an annular groove (144) is defined within the radial surface. A cylindrical outer surface having a first diameter is disposed between the radial surface and the first end, and a transition area is defined from the outer surface towards the radial surface. The transition area being angled radially inward such that the transition area has a second diameter that is less than the first diameter. An elastomeric seal (146) is disposed within the annular groove.

20 Claims, 5 Drawing Sheets

(56) References Cited

FOREIGN PATENT DOCUMENTS

| | | | |
|---|---|---|---|
| EP | 3364086 A1 | 8/2018 | |
| EP | 3070386 B1 | 4/2019 | |
| FR | 2873184 A1 * | 1/2006 | ............. F16L 19/10 |

* cited by examiner

TUBE CONNECTOR SYSTEMS

CROSS-REFERENCE TO RELATED APPLICATIONS

This application is a National Stage Application of PCT/IB2021/000025, filed on Jan. 22, 2021, the entire disclosure of which is incorporated herein by reference in its entirety. To the extent appropriate, a claim of priority is made to the above disclosed application.

BACKGROUND

The present disclosure relates generally to tube connectors, and more specifically, to cutting ring tube connectors.

Tube connector systems are used for tube connections in pressurized applications, such as, but not limited to, hydraulic systems. In examples, tube connector systems include a body, a cutting ring, and a union nut. On assembly, a tube end is received within the body and the union nut is tightened to the body. Upon tightening of the nut, cutting edges of the cutting ring carve into an outer surface of the tube to generate a high strength connection for high pressure operations.

SUMMARY

Aspects of the present disclosure relate to a connector system including: a fitting body including a first end and an opposite second end that define a longitudinal axis, the second end configured to receive at least a portion of a tube; a union nut threadingly coupled to the second end of the fitting body and rotatable around the longitudinal axis; and a cutting ring disposed proximate the second end of the fitting body and within the union nut, the cutting ring including: a first end engaging with the second end of the fitting body and having at least one cutting edge; a second end engaging with the union nut; a radially extending collar disposed between the first end and the second end, the collar having an annular radial surface facing the first end and an annular groove is defined within the radial surface; a cylindrical outer surface having a first diameter disposed between the radial surface and the first end, wherein a transition area is defined from the outer surface towards the radial surface, the transition area being angled radially inward such that the transition area has a second diameter that is less than the first diameter; and an elastomeric seal disposed at least partially within the annular groove.

In an example, the angle of the transition area is between 5° and 15°. In another example, the angle of the transition area is approximately 10°. In yet another example, the annular groove includes an inner side wall extending along the longitudinal axis, the inner side wall coplanar with the transition area such that at least a portion of the annular groove is radially undercut relative to the outer surface. In still another example, the annular groove includes an outer side wall radially spaced from the inner side wall, the outer side wall substantially parallel to the inner side wall. In an example, the annular groove includes an inner side wall radially spaced from an outer side wall and a base wall, the side walls have an axial length that is about equal to an axial length of the transition area.

In another example, a transition between the inner side wall or the outer side wall and the base wall is curved. In yet another example, a radial length of the base wall is greater than the axial length of the side walls.

Another aspect of the present disclosure relates to a connector system including: a tube fitting body adapted to receive an end of a tube; a union nut rotatably coupled to one end of the tube fitting body; and a cutting ring engaged with both the tube fitting body and the union nut, the cutting ring including: an inner surface configured to be positioned against the tube; an outer surface facing the tube fitting body and/or the union nut, the outer surface including a protruding collar having a radial surface with an annular groove defined therein, wherein the annular groove has an inner side wall that is angled radially inward from a radial plane defined by the radial surface; and an elastomeric seal disposed at least partially within the annular groove.

In an example, the angle of the inner side wall is between 5° and 15°. In another example, the angle of the inner side wall is approximately 10°. In yet another example, the inner side wall is coplanar with a transition area defined on the outer surface proximate the radial plane of the radial surface. In still another example, the inner side wall has an axial length that is about equal to an axial length of the transition area. In an example, the annular groove has an outer side wall that is inwardly offset from a radial outer edge of the radial surface. In another example, the inner side wall and the outer side wall are substantially parallel.

Another aspect of the present disclosure relates to a tube connector system including: a tube fitting body having an end with exterior threads and a first inner frustoconical bore, the end including a radial stop surface, wherein the end is configured to receive an end of a tube; a union nut threadably engaged with the exterior threads and having a second inner frustoconical bore; and a cutting ring including: a first end having an outer surface that tapers radially outward engaging with the first inner frustoconical bore and at least one cutting edge; a second end having an outer surface that tapers radially inward engaging with the second frustoconical bore; and a middle section disposed between the first end and the second end, an axial annular groove is defined in the middle section and faces the radial stop surface of the tube fitting body, the axial annular groove includes an inner side wall, an outer surface of the middle section adjacent the annular groove defines a transition area that is coplanar with the inner side wall and each taper radially inwardly in a direction towards the second end; and an elastomeric seal disposed at least partially within the annular groove, wherein upon tightening of the union nut on the tube fitting body, the union nut engages with the second end of the cutting ring to drive axial movement towards the tube fitting body so that the first end of the cutting ring radially compresses around the tube and the elastomeric seal engages with the radial stop surface.

In an example, the radially inward taper of the transition area and the inner side wall is between 5° and 15°. In another example, the radially inward taper of the transition area and the inner side wall is approximately 10°. In yet another example, an axial length of the inner side wall is about equal to an axial length of the transition area. In still another example, the annular groove further includes an outer side wall substantially parallel to the inner side wall.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
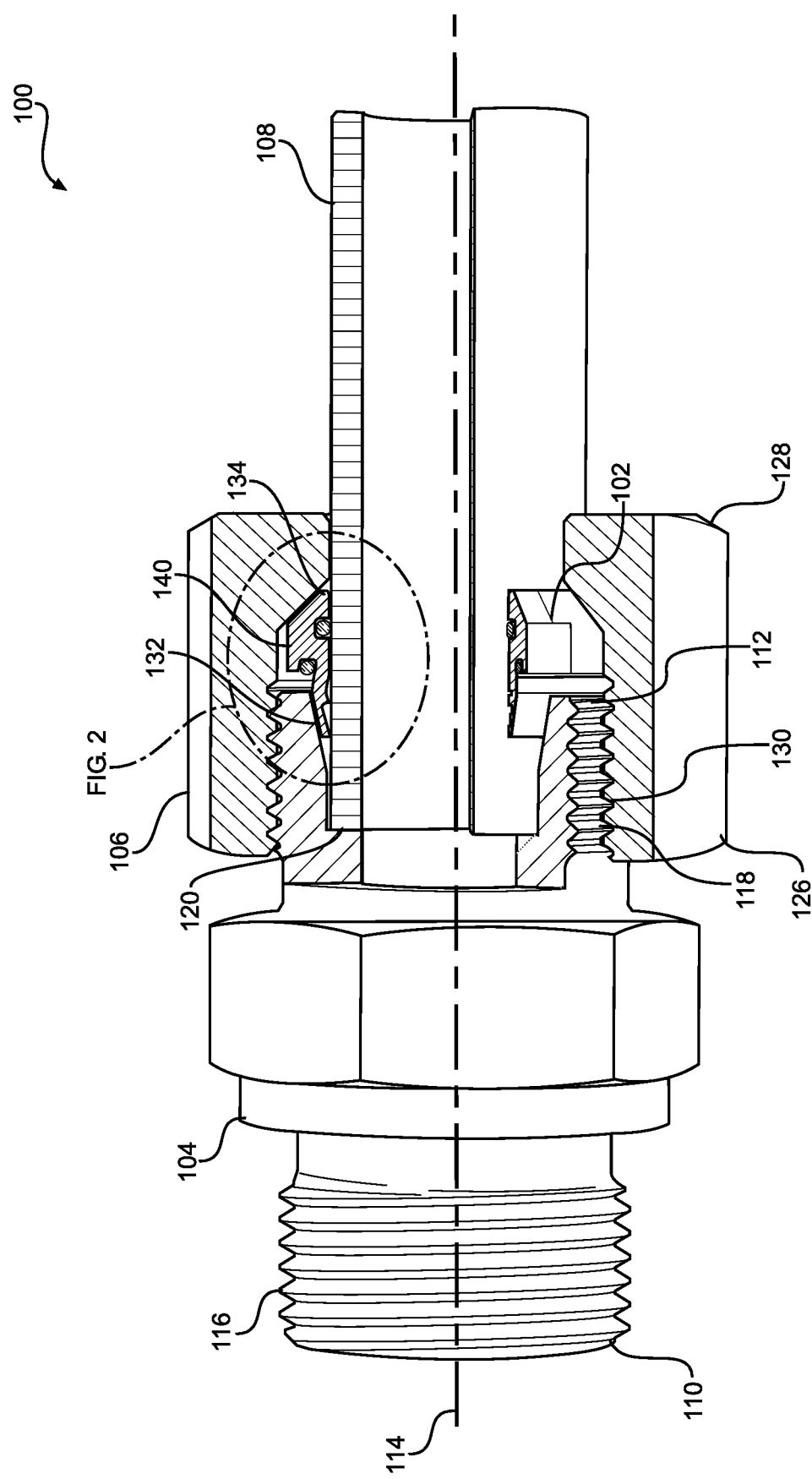
FIG. 1 is a partial cross-sectional view of an exemplary tube connector system.

The tube connector system described herein have features that increase performance and manufacturing efficiencies. These features of the tube connector systems increase the strength of a cutting ring system to reduce or prevent stress cracking while still enabling radial compression around a tube, ensure that a sealing element is keep in place on the cutting ring, reduce wear of the sealing element during assembly and repeated assembly of the tube connector systems, increase manufacturing efficiencies of an outer grove on the cutting ring for the sealing element, and facilitate complete tightening and sealing around the tube. In the examples described herein, the cutting ring has an outer radial surface which an axially extending annular groove is formed. The groove is shaped and sized to at least partially receive an elastomeric seal.

The elastomeric seal is used to form an outer leak path seal between a tube fitting body and the outer surface of the cutting ring. By having the seal axially compressed by the tube fitting body, wear is reduced on the seal. The radial surface also forms a stop member to define a compression limit for a cutting edge area of the cutting ring. By having a seal on the radial stop surface of the cutting ring, the cutting ring is ensured to be completely tightened around the tube in order to form the sealing function. Otherwise, leakage may occur from the tube connector system when not completely tightened. Additionally, because the groove is recessed into the cutting ring in an axial direction, machine tools used to form the groove can be more robust and loaded mainly in an axial direction so as to increase manufacturing efficiencies.

The axial groove of the cutting ring has a radial undercut that facilitates retaining the sealing element within the groove. The radial undercut also enables a transition area to be formed between the cutting edge area of the cutting ring and the radial surface that holds the seal. The transition area is angled radially inward and reduces a high stress junction between the more flexible cutting edge area and the stiffer radial surface, thereby reducing cracking in the cutting ring when compressed around the tube. Given the foregoing, a more efficient and increased performance tube connector system is provided herein.

Many components of the tube connector system may be referred to as having generally cylindrically, circular, annular, frustoconical, or conical features, and as having cylindrical or circular holes, cavities, and openings. Such features may be referred to, or defined by, a circumference, radius, external surface, internal surface, and/or other terms appropriate for defining such features. It should be noted that such features may alternatively be elliptical, polygonal, and the like. As used herein, the terms "axial" and "longitudinal" refer to directions and orientations, which extend substantially parallel to a centerline of the tube connector system. Moreover, the terms "radial" and "radially" refer to directions and orientations, which extend substantially perpendicular to the centerline of the tube connector system. In addition, as used herein, the terms "circumferential" and "circumferentially" refer to directions and orientations, which extend arcuately about the centerline of the tube connector system.

Figure 2:
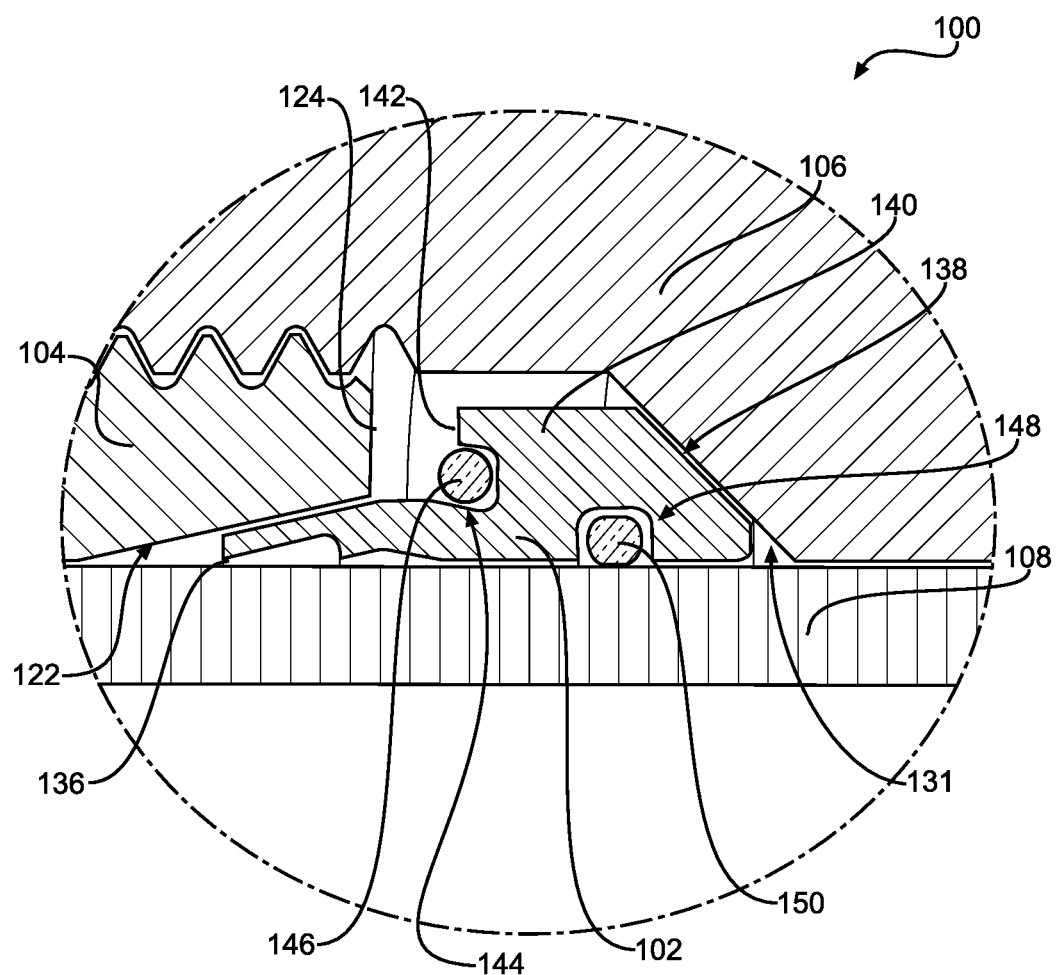
FIG. 2 is an enlarged view of a cutting ring of the tube connector system shown in FIG. 1.

FIG. 1 is a partial cross-sectional view of an exemplary tube connector system 100. FIG. 2 is an enlarged view of a cutting ring 102 of the tube connector system 100. Referring concurrently to FIGS. 1 and 2, the tube connector system 100 includes a tube fitting body 104, a union nut 106, and the cutting ring 102, and is configured to couple to an end of a tube/pipe 108. In an aspect, the tube 108 may be a metallic tube configured to carry a medium, such as, but not limited to a hydraulic fluid of a hydraulic system. Other tube configurations are also contemplated herein. The tube fitting body 104 has a first end 110 and an opposite second end 112 that define a longitudinal axis 114. The first end 110 can have different connecting ports, such as, but not limited to an outer surface with a plurality of external threads 116. The second end 112 is configured to receive the end of the tube 108. The second end 112 has an outer surface with a plurality of external threads 118 and an interior surface that has a tube stop shoulder 120 and an inner frustoconical bore 122.

The tube stop shoulder 120 has an radial surface that faces the second end 112 and is adapted to receive the end of the tube 108. The shoulder 120 defines the insertion distance of the tube 108 within the tube fitting body 104 and so that the tube 108 is positioned coaxially along the longitudinal axis 114 with the fitting body 104. The inner frustoconical bore 122 extends axially from the second end 112 towards the stop shoulder 120 and tapers radially inward in this direction. As such, the inner frustoconical bore 122 has a larger inner diameter at the second end 112 than at other locations of the bore 122. The inner frustoconical bore 122 does not axially extend all the way to the tube stop shoulder 120. The second end 112 of the tube fitting body 104 has a radial stop surface 124 that radially extends between the inner surface and the outer surface of the fitting body 104.

The union nut 106 is rotatably coupled to the second end 112 of the tube fitting body 104 and the tube 108 extends therethrough. The union nut 106 has a first end 126 and an opposite second end 128 that extend along the longitudinal axis 114. The first end 126 has an inner surface with a plurality of internal threads 130 so that the union nut 106 threadably engages with the fitting body 104 and can be tightened to the fitting body 104 by rotating around the longitudinal axis 114. The second end 128 has an inner surface with an inner frustoconical bore 131. In the example, the bore 131 is offset from the second end 128 and positioned between the internal threads 130 and the second end 128. The inner frustoconical bore 131 extends axially from proximate the second end 128 towards the internal threads 130 and tapers radially outward in this direction. As such, the inner frustoconical bore 131 has a smaller inner diameter proximate the second end 128 that at other locations of the bore 131.

The cutting ring 102 is disposed proximate the second end 112 of the tube fitting body 104 and within the union nut 106. The cutting ring 102 engages with both the tube fitting body 104 and the union nut 106, and upon tightening of the union nut 106, the cutting ring 102 axially moves along the longitudinal axis 114 and at least partially radially compresses around the tube 108 to form a secure coupling of the tube connector system 100 to the tube 108.

In the example, the cutting ring 102 includes a first end 132 and an opposite second end 134. The first end 132 includes one or more cutting edges 136 on its inner surface and engages with the inner frustoconical bore 122 of the second end 112 of the tube fitting body 104 with its outer surface. The second end 134 includes a radially oblique surface 138 that engages with the inner frustoconical bore 131 of the second end 128 of the union nut 106. A radially protruding collar 140 is disposed between the first end 132 and the second end 134. An annular radial surface 142 that faces the first end 132 is defined on the collar 140 and an annular axial groove 144 is defined therein. An elastomeric seal 146 is disposed at least partially in the axial groove 144. An annular radial groove 148 is defined in an inner surface of the cutting ring 102 and between the radial surface 142 and the second end 134. An elastomeric seal 150 is disposed at least partially in the radial groove 148. In an aspect, the elastomeric seals 146, 150 can take the form of an O-ring.

Figure 3:
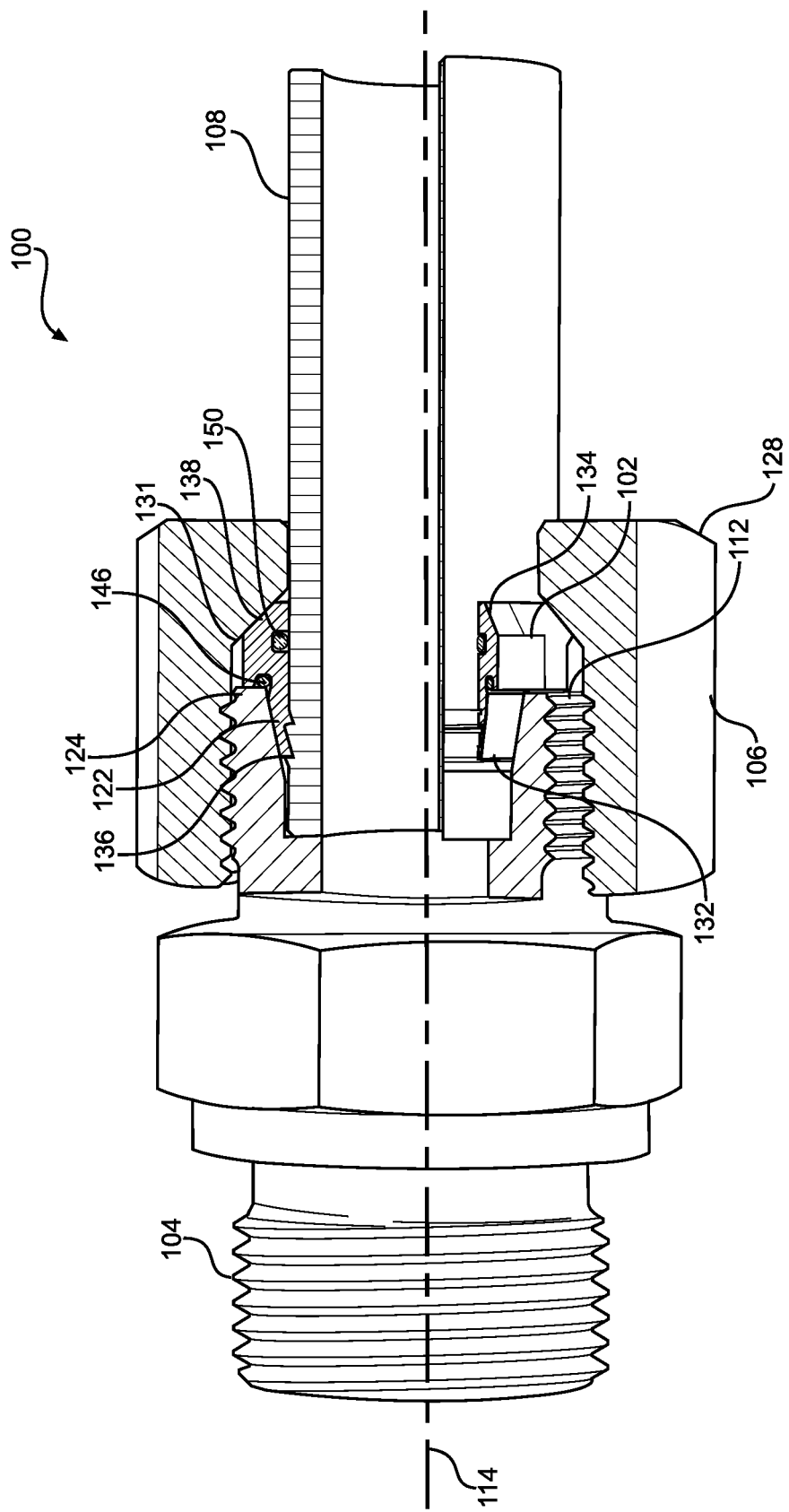
FIG. 3 is a partial cross-sectional view of the tube connector system in a tightened configuration.

FIG. 3 is a partial cross-sectional view of the tube connector system 100 in a tightened configuration. In operation, to couple the tube connector system 100 to the end of the tube 108, the union nut 106 is tightened on the tube fitting body 104 by rotating the union nut 106 around the longitudinal axis 114. This rotation of the union nut 106 linearly drives the second end 128 of the union nut 106 towards the second end 112 of the tube fitting body 104 along the longitudinal axis 114 thereby engaging the cutting ring 102 and compressing the cutting ring 102 around the tube 108. The cutting ring 102 engaging with the union nut 106 causes the inner frustoconical bore 131 of the union nut 106 to be in direct contact with the oblique surface 138 of the cutting ring 102 so that the linear movement of the union nut 106 induces corresponding axial movement of the cutting ring 102 in a direction towards the tube fitting body 104.

Additionally, because the oblique surface 138 is angled (e.g., about a 45° angle), the union nut 106 also at least partially radially compresses the second end 134 of the cutting ring 102 around the tube 108. This compression of the second end 134 of the cutting ring 102 secures the cutting ring 102 to the tube 108 and facilitates forming an inner leak path seal between the inner surface of the cutting ring 102 and the outer surface of the tube 108 with the elastomeric seal 150.

When the cutting ring 102 is driven at least partially into the tube fitting body 104, the first end 132 of the cutting ring 102 engages with the inner frustoconical bore 122 of the tube fitting body 104 which radially compresses the cutting edge 136 around the exterior of the tube 108 securing the first end 132 of the cutting ring 102 to the tube 108. The cutting edge 136 also provides a coupling that is resistant to leakage between the outer surface of the tube 108 and the inner surface of the cutting ring 102, and in addition to the elastomeric seal 150. As such, the inner leak path boundary between the cutting ring 102 and the tube 108 can be sealed by both the cutting edge 136 and the elastomeric seal 150.

This axial movement of the cutting ring 102 also positions the radial surface 142 of the collar 140 (both shown in FIG. 2) directly adjacent to the tube fitting body 104 and facilitates forming an outer leak path boundary seal between the outer surface of the cutting ring 102 and the tube fitting body 104 with the elastomeric seal 146. To decouple the tube 108 from the tube connector system 100, the union nut 106 rotatably releases from the tube fitting body 104 and the connection process is reversed. In the example, the tube connector system 100 can be repeatedly coupled and uncoupled to the tube 108 as required or desired.

To reduce or prevent overtightening of the cutting ring 102, the stop surface 124 of the second end 112 of the tube fitting body 104 defines an axial movement boundary for the cutting ring 102 when moving into the second end 112. The stop surface 124 engages with the radial surface 142 of the collar 140 to prevent the cutting ring 102 from axially moving further into the tube fitting body 104 when the union nut 106 is being tightened and over-compressing the cutting edges 136. Furthermore, by forming the seal at the stop surface 124, the tube connector system 100 ensures that the cutting ring 102 is properly compressed around the tube 108 prior to forming the seal in the outer leak path with the seal 146. As such, if the cutting ring 102 is not sufficiently tightened, leakage may occur from the tube connector system 100 giving indication to the user that an insufficient connection is formed.

The cutting ring 102 securing to the tube 108 generates a holding force between the tube connector system 100 and the tube 108 that resists dynamic loading applied to the connection. By securing both axial ends of the cutting ring 102 to the tube 108, the tube connector's resistance to vibration loads is increased. The shape and structure of the cutting ring 102 is described further below in reference to FIGS. 4 and 5.

Figure 4:
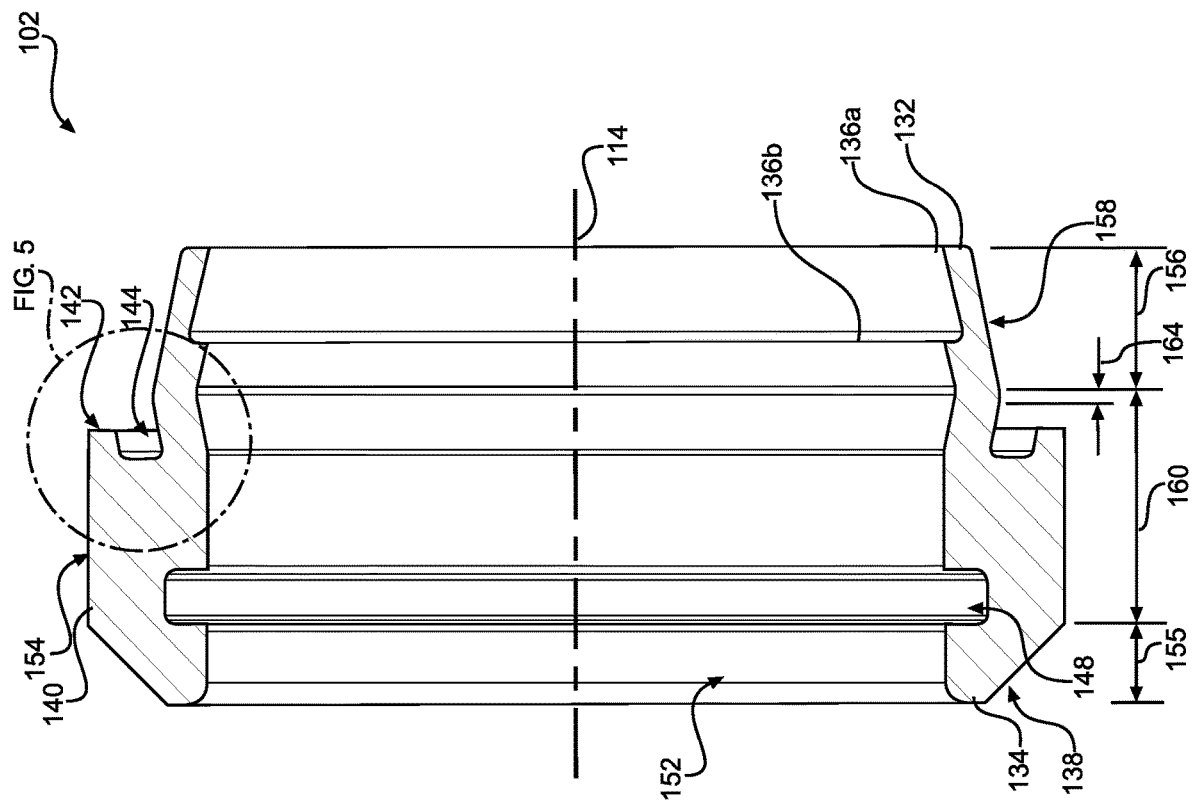
FIG. 4 is a cross-sectional view of the cutting ring.
Figure 5:
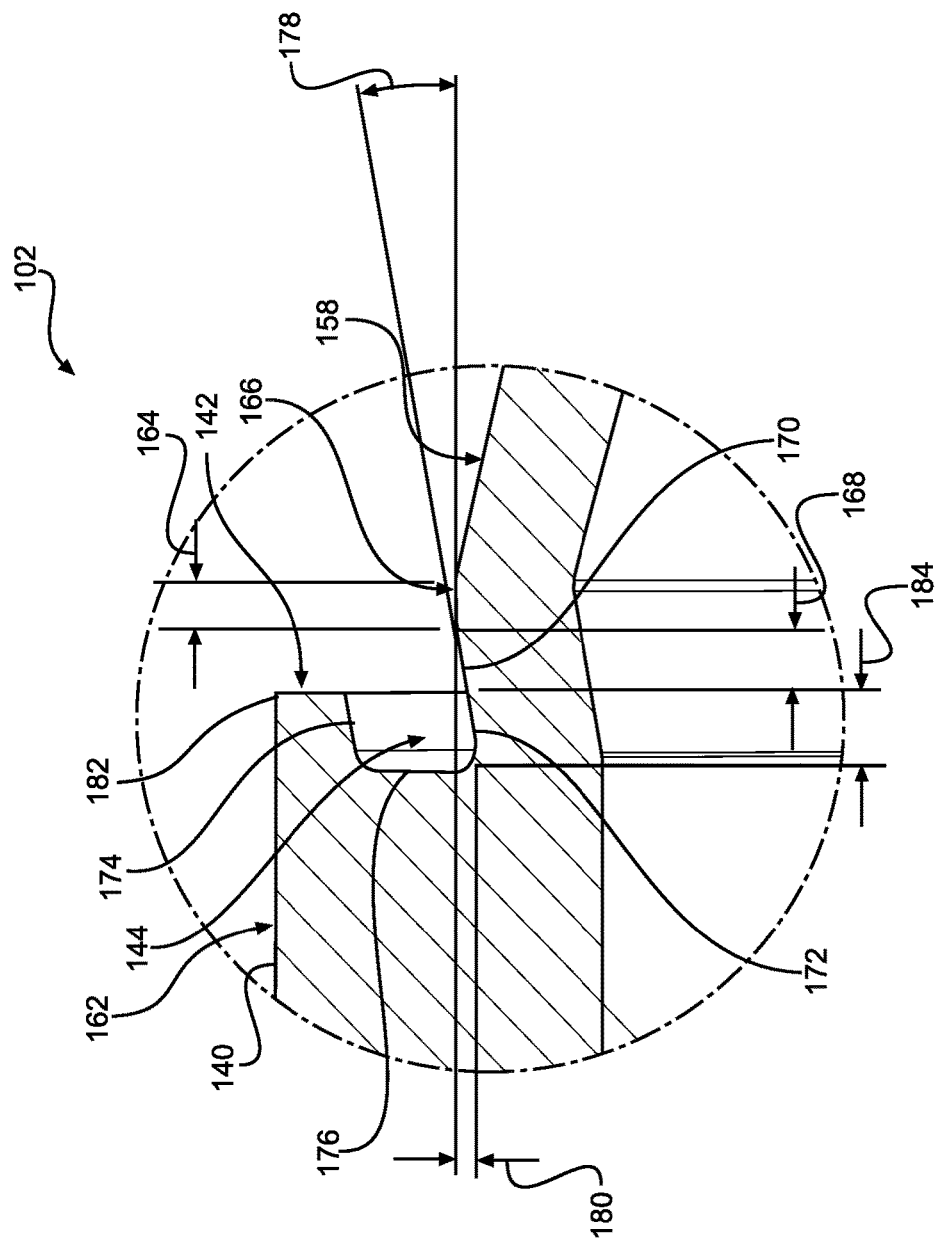
FIG. 5 is a partial enlarged view of the cutting ring shown in FIG. 4.

FIG. 4 is a cross-sectional view of the cutting ring 102. FIG. 5 is a partial enlarged view of the cutting ring 102. Referring concurrently to FIGS. 4 and 5, the cutting ring 102 has the first end 132 and the second end 134 that extend along the longitudinal axis 114 such that the cutting ring 102 is coaxial with both the tube fitting body 104 and the union nut 106 (both shown in FIG. 3). The cutting ring 102 includes an inner surface 152 configured to be positioned against the tube 108 (shown in FIG. 3) and an outer surface 154 that faces the tube fitting body 104 and/or the union nut 106.

The annular radial groove 148 is formed in the inner surface 152 and is disposed proximate the second end 134. The radial groove 148 is shaped and sized to receive the elastomeric seal 150 (shown in FIG. 3) and is recessed in a radial direction from the longitudinal axis 114. Also disposed at the second end 134, is the annular oblique surface 138 that is configured to engage with the union nut 106. The oblique surface 138 is formed in the outer surface 154 of the cutting ring 102 and extends radially outward from the second end 134 such that its diameter is the smallest at the second end 134. The oblique surface 138 defines an end area 155 of the cutting ring 102. The oblique surface 138 is configured to engage with the union nut 106 so as to drive axial movement of the cutting ring 102 and at least some radial compression of the cutting ring 102 at the second end 134.

The one or more cutting edges 136 are formed in the inner surface 152 and disposed proximate the first end 132. In the example, the cutting ring 102 includes a pair of axially spaced cutting edges 136 formed on the inner surface 152. One cutting edge 136a is at the first end 132 and the other cutting edge 136b is spaced axially inward from the first end 132. The cutting ring 102 can have less than two cutting edges or more than two cutting edges as required or desired. The pair of cutting edges 136 define a cutting area 156 of the cutting ring 102. In the example, the cutting area 156 extends axially inward from the first end 132 towards at least the cutting edge 136b. An outer surface 158 of the cutting area 156 tapers radially outward from the first end 132 (e.g., the diameter is the smallest at the first end 132) and is configured to engage with the tube fitting body 104. The cutting area 156 is configured to engage with the tube fitting body 104 and radially compress around the tube 108. In an aspect, the radial compression of the cutting area 156 is greater than the end area 155.

Between the cutting area 156 and the end area 155, the cutting ring 102 includes a middle section 160. The middle section 160 includes the collar 140 with the radial surface 142. The collar 140 has an outer surface 162 that is substantially cylindrical and having a diameter that is the greatest on the cutting ring 102. In operation, the cutting ring 102 must at least partially radially deflectable to compress around the tube and via engagement with the tube fitting body 104 and union nut 106. Additionally, the cutting ring 102 must have sufficient axial strength to that the union nut 106 can drive the movement and compression thereof. In the example, the thickness of the cutting area 156 is smaller than the rest of the cutting ring 102 so that the cutting area 156 can be compressed around the tube 108. In contrast, the thickness of the collar 140 is greater than the rest of the cutting ring 102 to provide stiffness to the cutting ring 102 and allow the tightening of the union nut 106 to axially move the cutting ring 102. The cutting area 156 generally deflects and compresses more than the collar 140 of the cutting ring 102 around the tube 108.

The radial surface 142 is substantially planar in the radial direction and is parallel to the stop surface 124 (shown in FIG. 3) of the tube fitting body 104 when the tube connector system 100 is assembled. The annular groove 144 is defined in the radial surface 142 and extends substantially in the axial direction (e.g., substantially parallel to the longitudinal axis 114). The annular axial groove 144 is shaped and sized to at least partially receive the elastomeric seal 146 (shown in FIG. 3).

Opposite the collar 140 and at the other end of the middle section 160, the cutting ring 102 includes a cylindrical portion 164. The cylindrical portion 164 is adjacent the cutting area 156 and extends axially inward on the cutting ring 102. An outer surface 166 of the cylindrical portion 164 has a diameter that is greater than the diameter of the outer surface 154 of the cutting ring 102 at both the first end 132 and the second end 134. The diameter of the outer surface 166 is also constant along its axial length. The outer surface 166, however, has a diameter that is less than the outer surface 162 of the collar 140. A transition area 168 is defined between the cylindrical portion 164 and the radial plane defined by the radial surface 142 on the cutting ring 102. The transition area 168 has an outer surface 170 that is angled radially inward in a direction towards the radial surface 142. As such, a diameter of the outer surface 170 of the transition area 168 is less than the diameter of the cylindrical portion 164.

The axial groove 144 is formed by an inner side wall 172 and an opposite radially spaced apart outer side wall 174, and a base wall 176. The inner and outer side wall 172, 174 both axially extend along the longitudinal axis 114, while the base wall 176 extends along a radial direction. The inner side wall 172 is coplanar with the outer surface 170 of the transition area 168, and as such, the inner side wall 172 is also angled radially inward in a direction towards the second end 134 of the cutting ring 102. In an aspect, an angle 178 of the transition area 168 and the inner side wall 172 is between 2° and 25° relative to horizontal (e.g., the longitudinal axis 114). In another aspect, the angle 178 of the transition area 168 and the inner side wall 172 is between 5° and 15°. In yet another aspect, the angle 178 of the transition area 168 and the inner side wall 172 is approximately 10°.

The angling of the outer surfaces of the transition area 168 and the inner side wall 172 relative to the cylindrical portion 164 form a radial undercut 180 in the groove 144. This radial undercut 180 enables the elastomeric seal 146 to be retained in place more efficiently during use of the tube connector system 100.

As illustrated in FIGS. 4 and 5, the middle section 160 includes both the transition area 168 and the cylindrical portion 164. It should be appreciated, however, that in other examples, the transition area 168 may extend up to the cutting area 156, and the cutting ring 102 may not include the transition area 168.

In the example, the outer side wall 174 is substantially parallel to the inner side wall 172 such that it is also angled radially inward. The outer side wall 174 is radially inwardly offset from a radial outer edge 182 of the radial surface 142 so that the radial surface 142 can engage with the stop surface 124 of the tube fitting body 104. The transitions between the inner side wall 172 or the outer side wall 174 and the base wall 176 can be curved. In an aspect, an axial length 184 of the inner side wall 172 is about equal to the axial length of the transition area 168. In another aspect, a radial length of the base wall 176 is greater than the axial length 184 of the side wall 172. In yet another aspect, the thickness of the cutting ring at the transition area 168 is greater than the cutting area 156, but less than the collar 140.

By forming the groove 144 on the radial surface 142 and having the transition area 168 being angled in the axial direction, the cutting ring 102 has a number of performance improvements when compared to cutting rings that have an outer flow path seal disposed within a radially extending circumferential grooved formed in a circumferential outer surface of the cutting ring. The overall axial length of the inner side wall 172 and the transition area 168 enables the more flexible cutting area 156 to be separated from the stiffer collar 140, thereby reducing stress induced from the tightening of the tube connector system 100 at the junction between the cutting area 156 and the collar 140. By reducing stress in the cutting ring 102, cracks are reduced or prevented from forming in the cutting ring 102 and the coupling strength of the cutting area 156 is increased. In contrast, when the seal for the outer leak path is disposed on a circumferential surface, the material thickness of the cutting ring proximate the seal is thinner, thereby reducing cutting edge strength and axial stiffness.

Additionally, by forming the outer leak path seal on the radial surface 142, the tube fitting body 104 compresses the seal 146 in an axial direction only. This configuration reduces wear on the seal 146 when compared to having the seal disposed on a circumferential surface which has the tube fitting body slide across the seal axially and increase wear on the seal. Furthermore, the outer leak path seal is formed only when the cutting ring 102 is engaged with the stop surface 124 of the tube fitting body 104 so that the cutting area 156 is fully compressed around the tube 108. If the cutting area 156 is not fully compressed around the tube 108, the outer leak path seal is not formed and leakage may occur, thus providing an indication to the user that the tube connector system 100 is not secured around the tube 108. In contrast, if the seal is axially in front of the radial stop surface, the outer leak path seal may be formed without fully compressing the cutting area around the tube 108 and no leak indication is generated or provided.

The shape and configuration of the axial groove 144 in the cutting ring 102 also increases manufacturing efficiencies, because it is cut with one axial tool movement. When compared to forming a groove on a radial surface with both an axial cut-in and a second radial infeed, the tool for forming the axial groove 144 can be loaded mainly in an axial direction without significant bending moments. Furthermore, the tool itself can be more robust because the shaft can have the same dimension as the width of the cut-in and a constant cross-section.

In further examples, the tube connector systems may be configured differently than described in the above examples. The described grooves, lips, threads, anti-rotation features, displacement stops, etc., may be replaced with other appropriate mating features that allow the respective components to be appropriate coupled, such as, but not limited to threadably, removably, clampably, slidably coupled, or a combination thereof. Generally, tube connector systems including the tube fitting body, union nut, cutting ring, and elastomeric seals may be made of materials such as, but not limited to, metal, plastic, rubber, ceramic, nylon, silicone, or a combination thereof.

In the examples disclosed herein, the tube connector system with the described cutting ring is more efficient and has increased performance because of the geometry of the cutting ring and placement of the outer leak path seal. The above concept may be further improved if the following features are added. It is to be noted that the following features may be added individually and independent of each other.

The outer leak path seal is formed between two radial surfaces between the tube fitting body and the cutting ring. These two radial surfaces also form an axial stop of the cutting ring relative to the tube fitting body. This position ensures that the cutting ring is completely compressed around the tube prior to forming the seal. If the cutting ring is not sufficiently tightened, leakage may occur from the tube connector system giving indication to the user that an insufficient connection is formed. Additionally, the wear on the seal from the tube fitting body is reduced.

The seal is formed by an elastomeric seal seated within an axially extending groove on a radial surface of the cutting ring. This groove orientation and configuration increases manufacturing efficiencies of the cutting ring. The tool can be loaded mainly in an axial direction without significant bending moments, and can be more robust because the shaft can have the same dimension as the width of the cut-in with a constant cross-section.

A portion of the axial groove is radially undercut relative to the cutting edge section so that the sealing element is more securely kept in place.

Additionally, a transition area is defined between the cutting edges of the cutting ring and the axial groove. The transition area is angled radially inward in a direction to end of the cutting ring opposite the cutting edges. In examples, this angle is between 5° and 15°. The transition area enables a more flexible cutting edge area to be separated from the stiffer collar, thereby reducing stress induced from the tightening of the tube connection system at the junction between the cutting area and the collar and reducing or preventing stress cracks in the cutting ring.

This disclosure describes some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art. Any number of the features of the different examples described herein may be combined into one single example and alternate examples having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A connector system comprising:
    a fitting body comprising a first end and an opposite second end that define a longitudinal axis, the second end configured to receive at least a portion of a tube;
    a union nut threadingly coupled to the second end of the fitting body and rotatable around the longitudinal axis; and
    a cutting ring disposed proximate the second end of the fitting body and within the union nut, the cutting ring comprising:
        a first end engaging with the second end of the fitting body and having at least one cutting edge;
        a second end engaging with the union nut;
        a radially extending collar disposed between the first end and the second end of the cutting ring, the collar having an annular radial surface facing the first end of the cutting ring and an annular groove is defined within the radial surface;
        a cylindrical outer surface having a first diameter disposed between the radial surface and the first end of the cutting ring, wherein a transition area is defined from the outer surface towards the radial surface and coplanar with at least a portion of the annular groove, the transition area being angled radially inward such that the transition area has a second diameter that is less than the first diameter; and
    an elastomeric seal disposed at least partially within the annular groove.

2. The connector system of claim 1, wherein the angle of the transition area is between 5° and 15°.

3. The connector system of claim 2, wherein the angle of the transition area is approximately 10°.

4. The connector system of claim 1, wherein the annular groove comprises an inner side wall extending along the longitudinal axis, the inner side wall coplanar with the transition area such that at least a portion of the annular groove is radially undercut relative to the outer surface.

5. The connector system of claim 4, wherein the annular groove comprises an outer side wall radially spaced from the inner side wall, the outer side wall substantially parallel to the inner side wall.

6. The connector system of claim 1, wherein the annular groove comprises an inner side wall radially spaced from an outer side wall and a base wall, wherein the side walls have an axial length that is about equal to an axial length of the transition area.

7. The connector system of claim 6, wherein a transition between the inner side wall or the outer side wall and the base wall is curved.

8. The connector system of claim 6, wherein a radial length of the base wall is greater than the axial length of the side walls.

9. A connector system comprising:
   a tube fitting body defining a longitudinal axis adapted to receive an end of a tube;
   a union nut rotatably coupled to one end of the tube fitting body; and
   a cutting ring engaged with both the tube fitting body and the union nut, the cutting ring comprising:
      an inner surface configured to be positioned against the tube;
      an outer surface facing the tube fitting body and/or the union nut, the outer surface comprising a protruding collar having a radial surface with an annular groove defined therein and a circumferential transition area directly adjacent the annular groove, wherein the annular groove has an inner side wall that is coplanar with the transition area, the inner side wall and the transition area angled radially inward relative to the longitudinal axis such that the transition area is positioned radially outward relative to the inner side wall; and
      an elastomeric seal disposed at least partially within the annular groove.

10. The connector system of claim 9, wherein the angle of the inner side wall is between 5° and 15°.

11. The connector system of claim 10, wherein the angle of the inner side wall is approximately 10°.

12. The connector system of claim 9, wherein the transition area is proximate the radial surface and faces the tube fitting body when the tube fitting body engages the elastomeric seal.

13. The connector system of claim 12, wherein the inner side wall has an axial length that is about equal to an axial length of the transition area.

14. The connector system of claim 9, wherein the annular groove has an outer side wall that is inwardly offset from a radial outer edge of the radial surface.

15. The connector system of claim 14, wherein the inner side wall and the outer side wall are substantially parallel.

16. A tube connector system comprising:
   a tube fitting body having an end with exterior threads and a first inner frustoconical bore, the end comprising a radial stop surface, wherein the end is configured to receive an end of a tube;
   a union nut threadably engaged with the exterior threads and having a second inner frustoconical bore; and
   a cutting ring comprising:
      a first end having an outer surface that tapers radially outward engaging with the first inner frustoconical bore and at least one cutting edge;
      a second end having an outer surface that tapers radially inward engaging with the second frustoconical bore; and
      a middle section disposed between the first end and the second end, an axial annular groove is defined in the middle section and faces the radial stop surface of the tube fitting body, the axial annular groove includes an inner side wall, an outer surface of the middle section adjacent the annular groove defines a transition area that is coplanar with the inner side wall, and the inner side wall and the transition area each taper radially inwardly in a direction towards the second end; and
   an elastomeric seal disposed at least partially within the annular groove,
   wherein upon tightening of the union nut on the tube fitting body, the union nut engages with the second end of the cutting ring to drive axial movement towards the tube fitting body so that the first end of the cutting ring radially compresses around the tube and the elastomeric seal engages with the radial stop surface.

17. The tube connector system of claim 16, wherein the radially inward taper of the transition area and the inner side wall is between 5° and 15°.

18. The connector system of claim 17, wherein the radially inward taper of the transition area and the inner side wall is approximately 10°.

19. The connector system of claim 16, wherein an axial length of the inner side wall is about equal to an axial length of the transition area.

20. The connector system of claim 16, wherein the annular groove further includes an outer side wall substantially parallel to the inner side wall.

\* \* \* \* \*